United States Patent

Hickox et al.

Patent Number: 5,187,627
Date of Patent: Feb. 16, 1993

[54] MAGNETIC LATCH AND CRASH STOP

[75] Inventors: Thomas A. Hickox, Santa Clara County; Jeffrey P. Stram, Santa Cruz County, both of Calif.

[73] Assignee: Seagate Technology, Inc., Scotts Valley, Calif.

[21] Appl. No.: 611,412

[22] Filed: Nov. 9, 1990

[51] Int. Cl.$^5$ ............................................. G11B 5/54
[52] U.S. Cl. ...................................................... 360/105
[58] Field of Search .......................................... 360/105

[56] References Cited

U.S. PATENT DOCUMENTS 4,890,176 12/1989 Casey .................................. 360/105

Primary Examiner—A. J. Heinz
Attorney, Agent, or Firm—Flehr, Hohbach, Test, Albritton & Herbert

[57] ABSTRACT

A magnetic latching mechanism is provided including a permanent magnet imbedded in and completely surrounded by rubber or other resilient material. This combination is fixedly mounted to the housing or other non-moving portion of the disc drive and a small metal plate of magnetizable material is mounted to the moving actuator mechanism at a position such that it will come into contact with the crash stop and latch mechanism when the actuator is at its desired park position. The rubber or other resilient material provides the desired "soft" contact for the crash stop and the thickness of the rubber at the contact point controls the amount of latching force applied by the magnet to the metal plate. Since the latching action is purely magnetic, there is no solenoid needed to release the latch. When power is applied and the disc has attained the speed necessary to "fly" the heads, the actuator motor is used to overcome the magnetic force of the latch. Since the amount of latching force is controlled by the thickness of the rubber or other resilient material between the permanent magnet and the moving plate, it is a simple matter to select a latching force sufficient to hold the heads in the park position over the specified range of shock load of the disc drive and yet small enough to be overcome by the actuator motor.

24 Claims, 5 Drawing Sheets

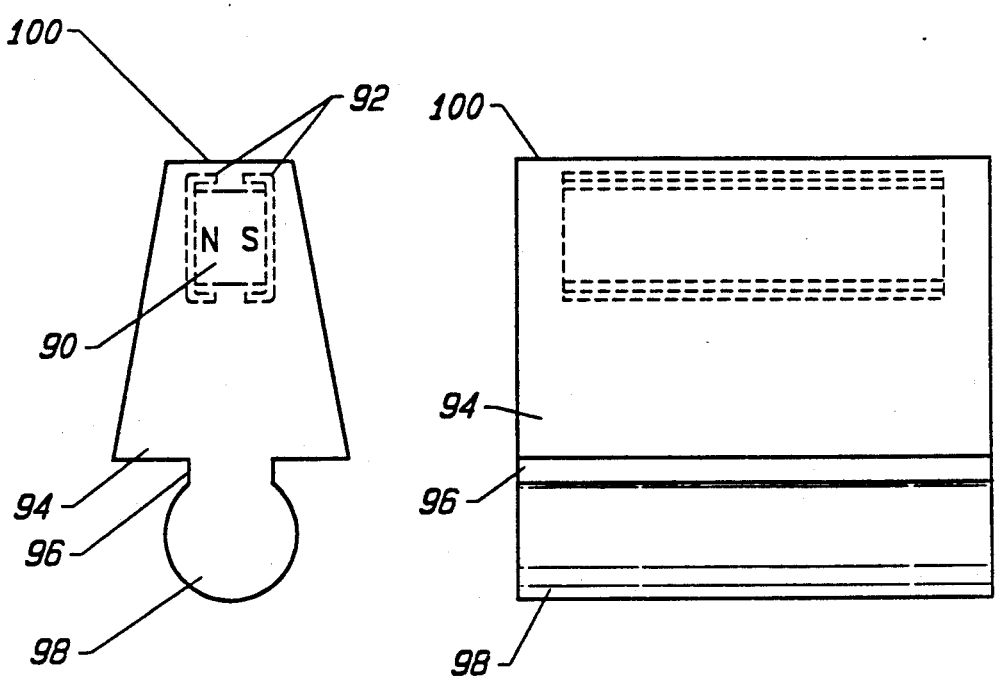
FIG. 3A
FIG. 3C
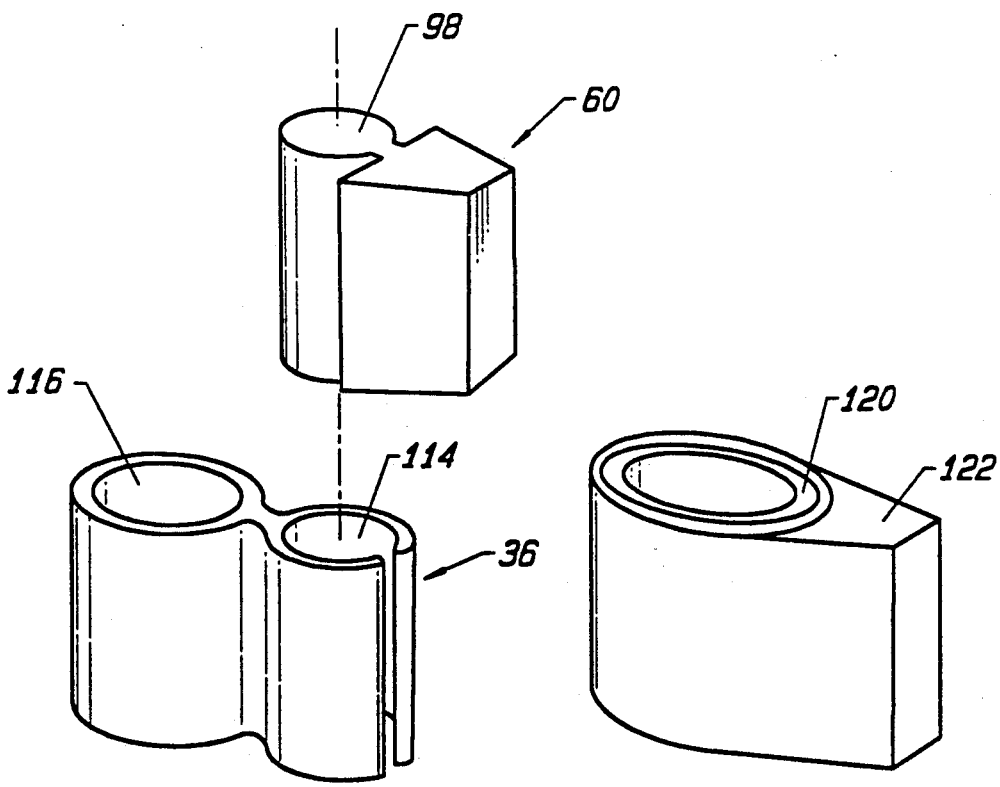
FIG. 3B
FIG. 4

MAGNETIC LATCH AND CRASH STOP

This invention relates generally to the field of rigid disc drive data storage devices and more specifically to an improved combination magnetic latch and crash stop used to latch the read/write heads of the disc drive in a "parked" position and to limit the range of motion of the read/write heads in the direction of the parked position.

BACKGROUND OF THE INVENTION

Rigid disc drive data storage devices of the type in which the present invention is particularly useful are well known in the industry. Such devices incorporate a base housing to which is mounted a spindle motor, usually of the brushless DC type, having a hub supporting at least one data storage disc. Each disc carries a number of circular, concentric data tracks on which data can be stored and from which the data can later be retrieved. The processes of storing and retrieving data are usually referred to as "writing" and "reading", respectively, and are accomplished using read/write heads. There is usually one read/write head associated with each surface of each disc.

These read/write heads are incorporated in a slider assembly that is shaped to allow the heads to "fly" above the surface of the disc on a very thin layer of air dragged along by the spinning of the disc. During normal read/write operations, therefore, the heads and discs never come into contact.

In order for the single head to access the multiple tracks on the disc surface, the head is mounted on a load beam/gimbal assembly (LGA) which is in turn attached to some sort of actuator.

Disc drive actuators are generally one of two types: linear or rotary.

The linear actuator moves the heads on a straight line which is a radius of—or parallel to a radius of—the disc, guided by an arrangement of ball bearings or bushings with guide rails or rods.

The rotary actuator pivots about a single point closely adjacent the outer diameter of the disc and moves the heads along an arc—centered on the pivot—which crosses all of the data tracks.

Whichever type of actuator is used to move the heads, some sort of motor is incorporated to power the motion. Again, there are two commonly used motor types: stepper motors and voice coil motors (VCMs). The primary function of whichever motor is used is to move the heads from track to track in a controlled fashion under the control of electronic circuitry.

A second function of the actuator motor is to move the read/write heads to a preselected "park" position when a loss of power is detected. This is usually done to ensure that the heads do not come into direct contact with the surface of the disc where data has been written when the discs stop spinning and the heads stop "flying".

With stepper motor actuators, the detent magnetism of the stepper motor is usually adequate to hold the heads in the parked position. However, VIM actuators have no inherent detent to hold the heads in the parked position, and therefore must incorporate some sort of latch mechanism.

The power to park the heads at the time of a power loss is typically derived from the back EMF of the spindle motor, i. e., the spindle motor continues to spin after a loss of power due to inertia, and acts as a generator. Simply applying a DC current to the coil of a VIM is sufficient to move the actuator to either end of is range of travel, dependent on the polarity of the current applied. This technology is well known in the art.

An example of using the back EMF of the spindle motor to park the heads in a stepper motor drive is disclosed in U.S. Pat. No. 4,679,102, issued Jul. 7, 1987 and assigned to the assignee of the present invention and incorporated herein by reference.

With the growing market in laptop and notebook personal computers, manufacturers of rigid disc drives have begun to use ramping devices for parking the heads. These ramping devices have the added advantage of preventing any direct contact between the discs and the read/ write heads, since, when power is applied to the disc drive, the heads remain parked on the ramps until the spindle motor has begun spinning fast enough to "fly" the heads. The heads are then carefully moved off the ramp structure onto an already established "air bearing" as the thin layer of rapidly spinning air is known.

Once again, with a stepper motor drive, the magnetic detent of the stepper motor is usually sufficient to "latch" the heads into the park position on ramps, while VIM drives—having no inherent detent—require some sort of latch mechanism to hold the heads in the park position.

Another consideration that must be made by the designer of a disc drive is the possibility of failure of the electronic circuitry controlling the movement of the actuator. Should such a failure occur, it is easy to imagine the actuator moving the heads in an uncontrolled manner to either end of the intended range of motion. If this uncontrolled motion is toward the inside of the disc, it could easily result in the heads contacting the hub that mounts the discs, resulting in fatal damage to the heads. Depending on the design, similar damage could result if the heads are moved outward on the disc with no control.

Also, as previously mentioned, the actuator is frequently intended to force the heads to a park position when power is lost, and this park position is usually at one extreme of the actuator range of motion. When ramps are not used, and the heads contact the disc in the park position, this park position is typically at the inner area of the disc to minimize the start torque requirement of the spindle motor. When ramping devices are used, the ramps—and therefore the park position—are located at the outside diameter of the discs.

Since these park operations occur at the loss of power, it would be unwise on the part of the designer to rely on electronic logic—powered by a deteriorating supply—to detect when the heads have been properly parked.

To limit the range of motion of the actuator and heads under these conditions, disc drive designers have long been known to include "crash stops" in their products. An example of crash stops is disclosed in U.S. U.S. Pat. No. 4,471,396, issued Sep. 11, 1984 and assigned to the assignee of the present invention and incorporated herein by reference.

Latches to hold the actuator of VIM disc drives in the park position are also well known in the art. Examples of typical latches are shown in U.S. Pat. Nos. 4,725,907, issued Feb. 16, 1988, 4,716,480, issued Dec. 29, 1987, and 4,890,176, issued Dec. 19, 1989, all assigned to the assignee of the present invention and incorporated herein by reference.

Frequently the crash stop and latch mechanisms are implemented as separate components, adding to the cost and complexity of the product. Furthermore, several typical latch mechanisms require a solenoid or similar powered device to release the actuator when power is applied, again adding cost and complexity and increasing power drain at power on.

OBJECTIVES OF THE INVENTION

It is an objective of the invention to provide an integrated crash stop and latch mechanism requiring a minimum of parts.

It is another objective of the invention that the crash stop and latch be easy and inexpensive to manufacture.

It is another objective of the invention that the crash stop and latch be easily and simply integrated with its mounting mean within the disc drive.

It is another objective of the invention that the crash stop provide a "soft" contact that will eliminate the risk of damage to the disc drive by such contact.

It is another objective of the invention that the latch mechanism require no power or additional components other than the actuator motor to unlatch when power is applied to the disc drive.

It is a further objective of the invention that the latching force of the latch be controllable over a narrow range.

SUMMARY OF THE INVENTION

The above-described objectives are attained in the present invention by providing a magnetic latching mechanism including a permanent magnet imbedded in and completely surrounded by rubber or other resilient material. This combination is fixedly mounted to the housing or other non-moving portion of the disc drive and a small metal plate of magnetizable material is mounted to the moving actuator mechanism at a position such that it will come into contact with the crash stop and latch mechanism when the actuator is at its desired park position. The rubber or other resilient material provides the desired "soft" contact for the crash stop and the thickness of the rubber at the contact point controls the amount of latching force applied by the magnet to the metal plate.

Furthermore, since the latching action is purely magnetic, there is no solenoid needed to release the latch. When power is applied and the disc has attained the speed necessary to "fly" the heads, the actuator motor is used to overcome the magnetic force of the latch. Since the amount of latching force is controlled by the thickness of the rubber or other resilient material between the permanent magnet and the moving plate, it is a simple matter to select a latching force sufficient to hold the heads in the park position over the specified range of shock load of the disc drive and yet small enough to be overcome by the actuator motor.

DESCRIPTION OF THE DRAWINGS

The features and advantages of the present invention may be best understood by referring to the accompanying drawings, wherein:

FIG. 3A and 3A are respectively a plan view of one embodiment of the magnetic latch and crash stop of the present invention;

FIG. 3B is an isometric view of the magnetic latch and crash stop of FIG. 3A, illustrating how it would be mounted in the disc drive;

FIG. 3C is a side view of one embodiment of the magnetic latch and crash stop of the present invention;

FIG. 4 is a drawing of another embodiment of the present invention;

DETAILED DESCRIPTION OF THE INVENTION

Figure 1:
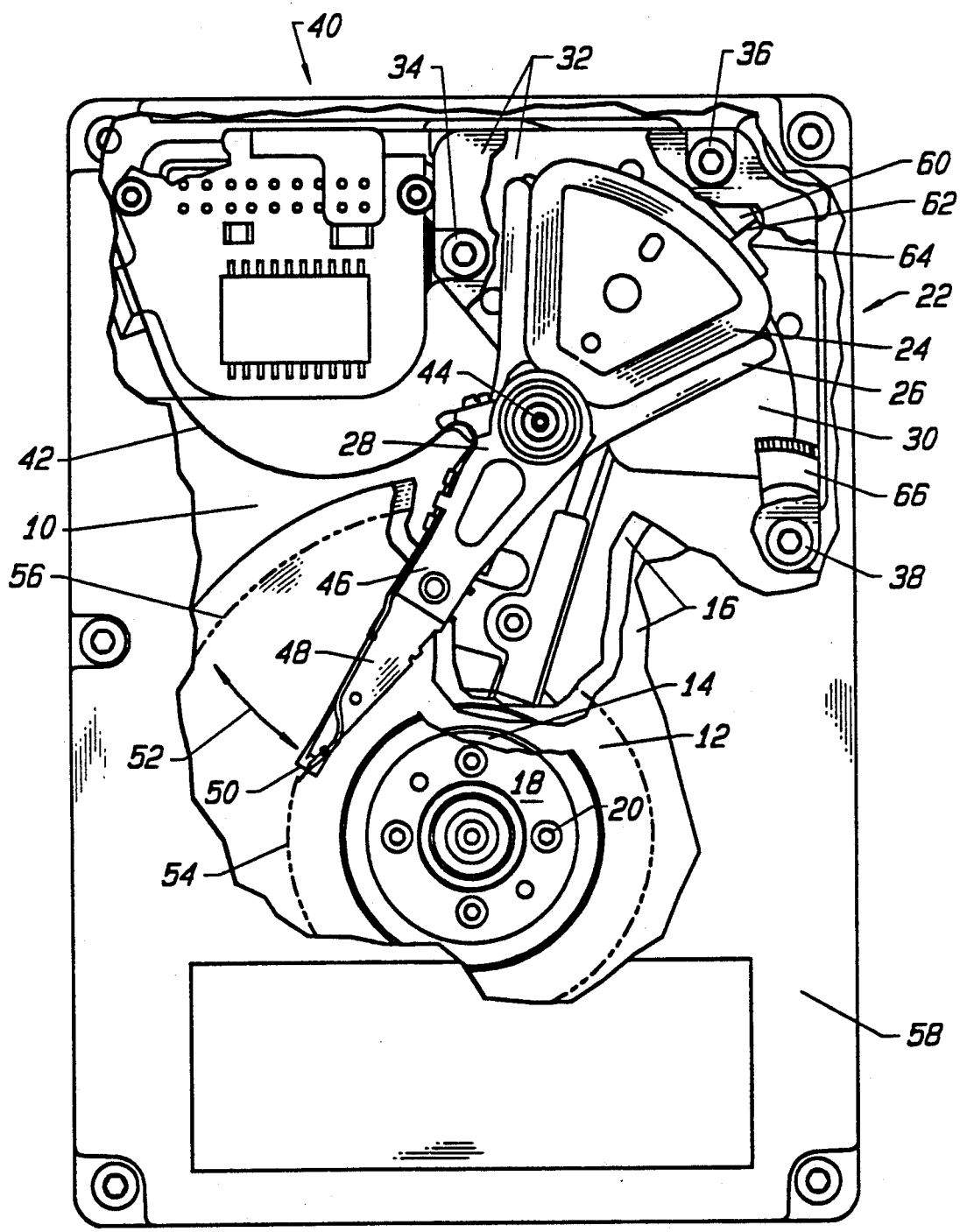
FIG. 1 is a plan drawing of a disc drive in which the invention is particularly useful.

Referring first to FIG. 1, shown is a rigid disc drive data storage device of the type in which the present invention is particularly useful. This example disc drive is of the rotary/VIM type. FIG. 1 contains many partial cutaways to show details of the assembly.

The disc drive consists of a base housing 10 to which other components are mounted. A spindle motor, shown generally at 12, is mounted to the base housing 10 and carries a hub 14 on which the discs 16 are supported. The discs 16 are secured to the hub 14 by a disc clamp 18 held by a screws 20. In this example, the discs will be spinning in the counter-clockwise direction as viewed.

A voice coil motor (VIM), shown generally at 22, is made up of a flat coil 24 mounted between two coil mounting arms 26 that are part of a Y-shaped actuator arm 28. The VIM is also made up of a pair of permanent magnets above and below the coil—one of which is shown at 30—attached to steel plates 32 spaced apart by standoffs 34, 36, 38. Electronic circuitry, some of which is shown generally at 40, supplies controlled DC current to the coil 24 via a printed circuit cable 42 to energize the coil 24 inducing magnetic flux which interacts with the magnetic field of the permanent magnets 30 to move the coil 24 and attached actuator arm 28 about a pivot point 44. The third portion of the actuator arm 28 is made up of several head mounting arms 46 which carry a number of load beam/gimbal assemblies (LGA) 48 to which are attached the read/write heads 50. As the actuator arm 28 pivots about the pivot point 44, the heads 50 are selectively moved along arc 52 to any of the data tracks lying between the innermost data track 54 and the outermost data track 56.

The entire assembly is enclosed by a top cover 58 mated to the base housing 10.

In the embodiment shown, the actuator motor 22 and the heads 50 are shown in the park position with the heads 50 over a portion of the discs 16 located inside the innermost data track 54.

The magnetic latch and crash stop of the present invention is shown at 60. This magnetic latch and crash stop 60 is mounted to a stationary standoff 36 from base housing 10 and is shown in co-operative engagement with a strike plate 62 made of magnetizable metal carried on a tab 64 attached to the movable coil 24. The actuator arm 28 and heads 50 will be magnetically held in this position until the electronic circuitry 40 supplies enough DC current of the proper polarity to overcome the magnetic force between the magnetic latch and crash stop 60 and the striker plate 62. The heads 50 would then be free for movement over the disc surface.

It should be noted that the strike plate is carried on the rear of the actuator arm 28, and extends to the rear of the coil 24. Previous latch designs placed the stationary element of the latch at the far end (arrow 33) of the path of travel, adding to the space devoted to the actuator. In this design the stationary element 36 is to the rear of the arc defined by the moving rotary actuator coil 24; the strike plate is carried near the portion of the arm which will be near to or in contact with the crash stop defining another limit on the path of travel of the actuator.

A second crash stop 66 is also shown in FIG. 1. Examination of FIG. 1 shows that, as the actuator arm 28 rotates clockwise, one of the coil mounting arms 26 will contact the second crash stop 66 at approximately the same time that the heads 50 are over the outermost data track 56, thus limiting the range of motion of the actuator arm 28.

Figure 2A:
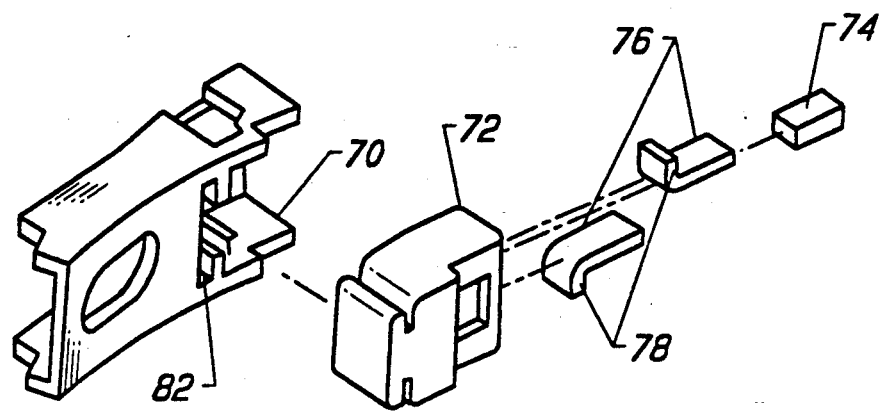
FIG. 2A is an assembly drawing of a magnetic latch and crash stop combination from the prior art.

Shown in FIG. 2A is an assembly drawing of a prior art magnetic latch and crash stop which is the subject of previously cited U.S. Pat. No. 4,890,176.

This prior art magnetic latch and crash stop consists of a frame 70, a elastic magnet holder 72, a permanent magnet 74 and a pair of flux concentrators or pole pieces 76.

When assembled, the pole pieces 76 are in contact with the upper and lower surface of the magnet 74. As can be seen, the pole pieces 76 each have a tab 78 at one end formed by bending the piece at a right angle. These tabs 78 are present to engage a portion (not shown) of the magnet holder 72. When the magnet 74, pole pieces 76 and magnet holder 72 have been assembled together, this subassembly is inserted into the frame using an extension 80 of the magnet holder 72 formed to fit into a corresponding notch 82 in the frame 70.

Figure 2B:
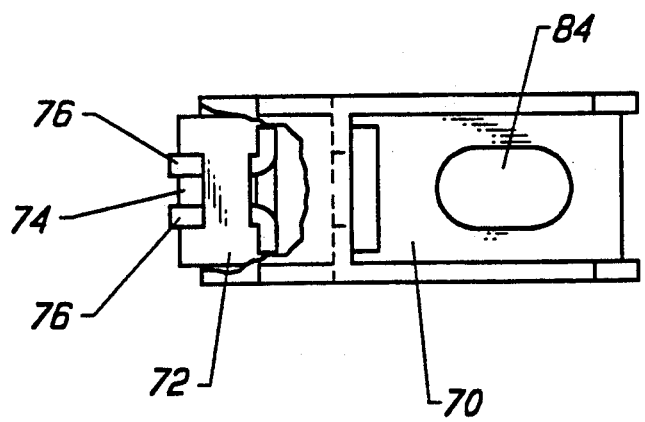
FIG. 2B is a side view of the magnetic latch of FIG. 2A as assembled.

The entire magnetic latch and crash stop assembly of FIG. 2A is shown assembled in FIG. 2B. This assembly would be mounted to a stationary portion of the actuator assembly using a elongated hole 84. The elongation of the hole 84 allows for adjustment of the position of the assembly in the unit.

As can be seen in FIG. 2B a portion of the frame 70 has been cut away to show the relationship of the magnet 74, pole pieces 76 and magnet holder 72. In this view, the tabs 78 on the pole pieces 76 are shown to be assembled into a notch in the magnet holder 72. The opposite ends of the pole pieces 76 extend beyond the magnet holder 72 and are thus exposed to contact a striker plate (not shown) mounted to a moving portion of the actuator. As mentioned earlier, the magnet holder 72 is made of rubber or some other elastic material.

If the striker plate on the moving portion of the actuator is imagined to be a vertical member moving toward the magnetic latch and crash stop of FIG. 2B from the left, it is easy to see that the first point of contact for the striker plate will be the ends of the pole pieces, and that the momentum of the moving striker plate will be absorbed by the resilient magnet holder 72. Also, any deviation rom the true vertical in the striker plate can be compensated for by the sliding magnetic contact between the pole pieces 76 and the magnet 74.

Turning now to FIGS. 3A and 3C, shown in plan and side views is one embodiment of the present invention. A permanent magnet 90 and an associated pair of pole pieces 92 are molded inside a polyurethane or butyl rubber latch body 94 shaped like an isosceles prism with the most acute angle truncated parallel to the long axis of the magnet 90 and pole pieces 92. The face 100 of the body formed by this truncation is the contact surface for the strike plate 62 (FIG. 1). At the opposite side of the latch body 94 from the contact surface 100 is a necked extension 96 which joins the body 94 to a cylindrical mounting member 98. Clearly, this embodiment includes less separate parts than the prior art example of FIGS. 2A and 2B. In fact, since the resilient body 94 of the component can be molded with the magnet 90 and pole pieces inside, the magnetic latch and crash stop of the present invention can be viewed as a single piece from the point of view of the drive manufacturer.

The method of mounting the magnetic latch and crash stop is best seen by referring to FIG. 3B.

In FIG. 3B, the magnetic latch and crash stop 60 of FIG. 3A is shown with a standoff and latch mount 36. This example of mounting the latch and crash stop works best in the type of disc drive illustrated in FIG. 1, where the standoff and latch mount 112 would be used in place of the standoff 36 of FIG. 1. Referring again to FIG. 3B, the cylindrical mounting member 98 of the magnetic latch and crash stop 110 is inserted into an appropriate cylindrical opening 114 in the standoff and latch mount 112. This completed assembly would then be inserted between the top and bottom plates (32 on FIG. 1) of the VIM and secured with a bolt through hole 116 in the standoff and latch mount 112.

Another embodiment of the present invention which would be suitable for use in the disc drive of FIG. 1 is shown in FIG. 4. Here the standoff element 120 has also been molded inside the latch body 122. The magnet is supported in the region between the standoff mounting hole and the contact surface. In this embodiment, the standoff, magnetic latch and crash stop have all become effectively one piece, which would again be mounted in the disc drive of FIG. 1 as explained above.

Figures 5A, 5B:
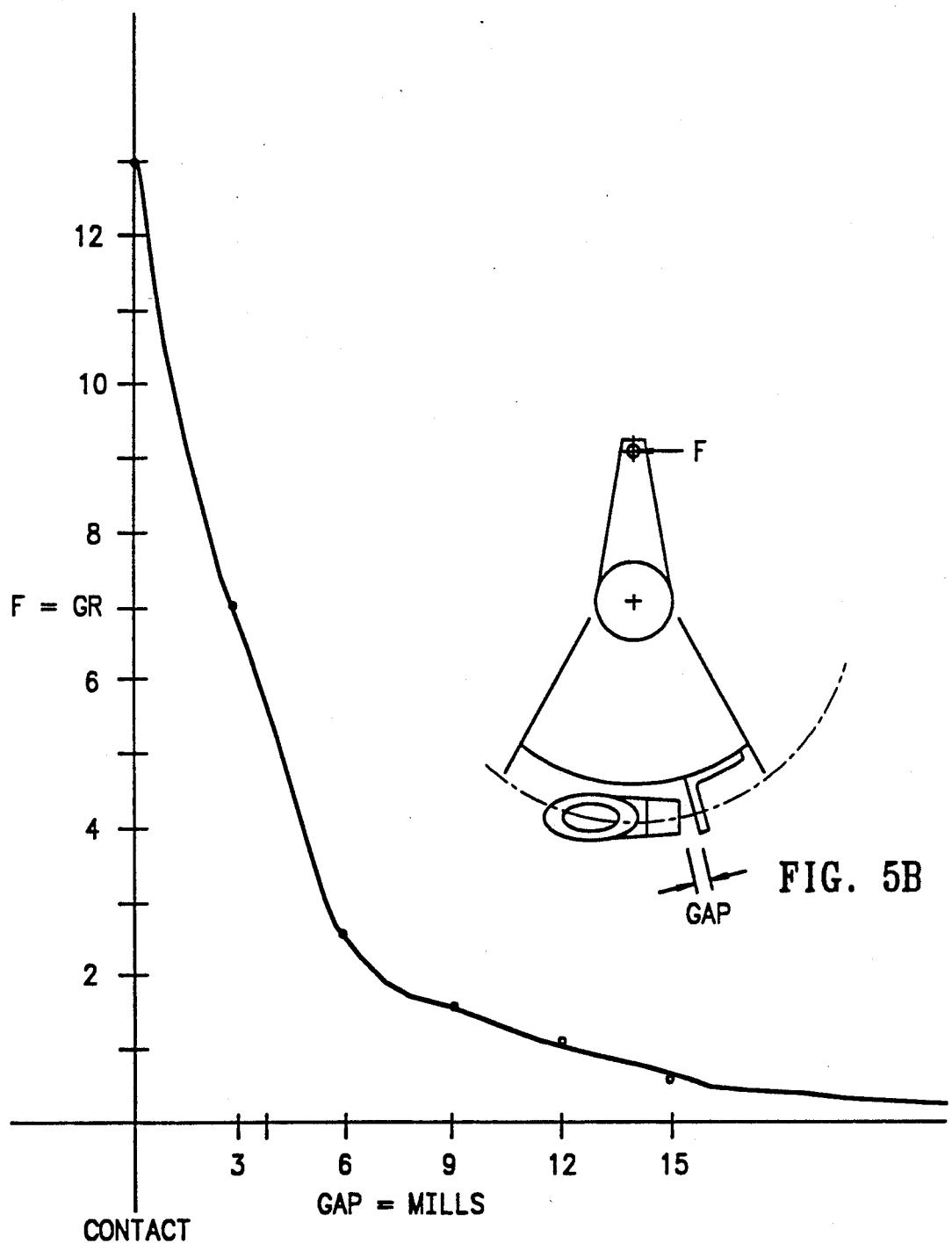
FIG. 5A is a graph comparing the distance of the magnet of the present invention from the moving plate on the actuator to the latching force exerted, with emphasis on the controllable latching force of the present invention.
FIG. 5B is a plan view of the device graphically depicted in FIG. 5.

Another advantage of the present invention becomes evident from a study of FIGS. 5A and 5B. FIG. 5A is a graph comparing the latching force in grams on the vertical scale to the gap between the magnet pole pieces and the striker plate on the horizontal scale for a magnet of a particular strength. As can be seen, gaps less than about 5 milli-inches produce relatively large latching forces. However, small variations in the gap in this part of the curve produce large variations in the latching force. Similarly it is apparent that when the gap becomes larger than about 9 milli-inches, the latching force falls rapidly toward zero, making gaps of these dimensions unsuitable for reliability reasons.

Only in that portion of the curve for gaps of between about 6 and 9 milli-inches does the latching force remain large enough to be counted upon to hold the actuator in the parked position, and yet permit small variations in latching force across relatively large variations in gap, allowing a reasonable tolerance for volume manufacturing.

By controlling the thickness of the rubber in the area of the contact surface, the gap between the magnet poles and the strike plate can be selected for a magnet of a known strength.

In order to select a magnet for a latch and optimize the gap (and thus the thickness of the rubber in the area of the contact surface), two factors must be considered:

1) the latching force must be large enough to ensure that the actuator remains latched in the park position over the entire specified range of non-operating shock;
2) the latching force must be small enough to guarantee that the actuator can overcome the latching force to release the actuator when desired The task of the designer is to optimize both of these factors. Shown in FIG. 6 is a graph which could be used to perform this task.

Figure 6:
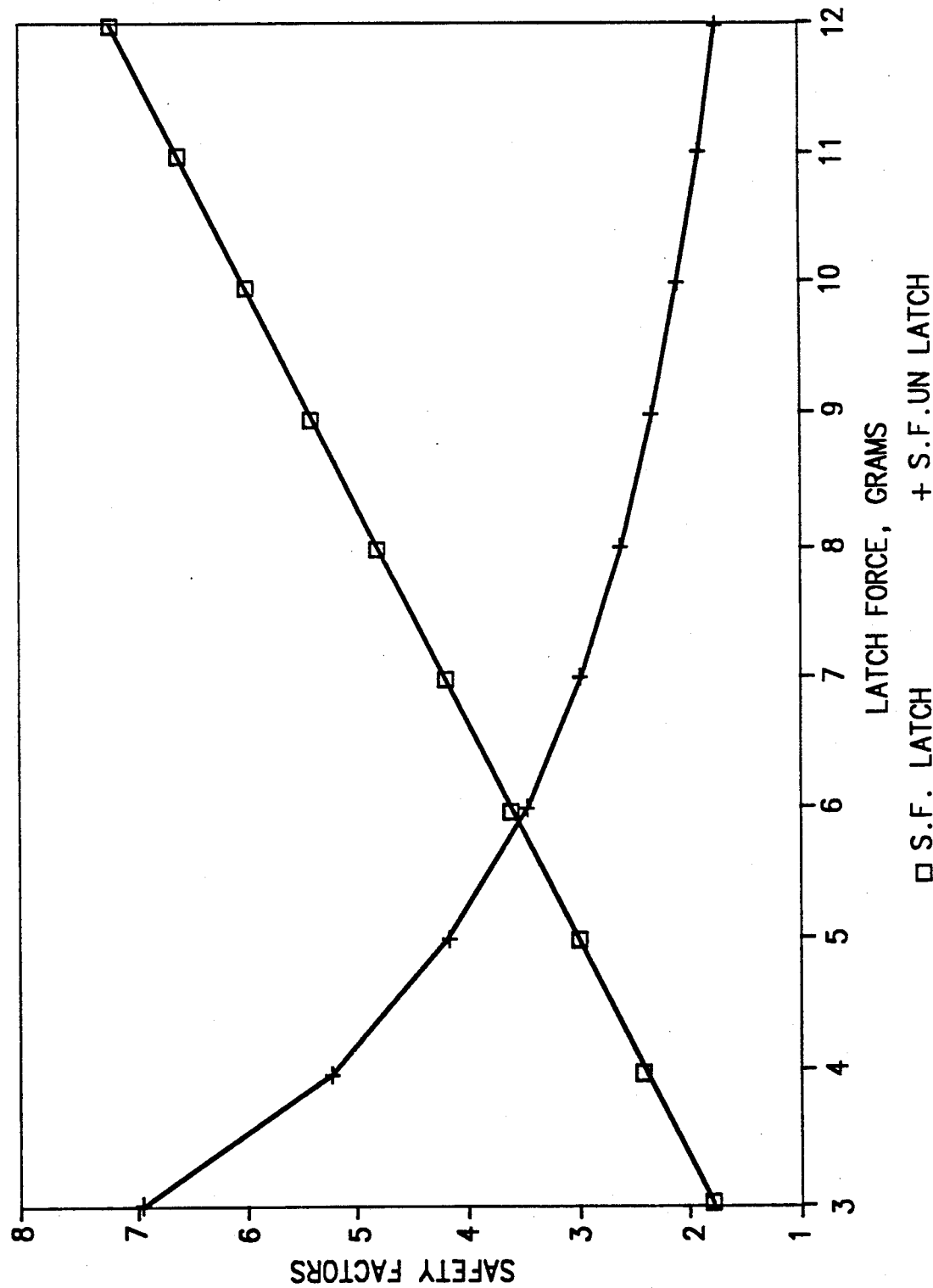
FIG. 6 is a graph used to optimize the latch design.

The graph of FIG. 6 plots the latch force in grams on the horizontal scale against a quantity called safety factor on the vertical scale. The "Safety Factor" may be thought of as multiples of the minimum or maximum requirement for a particular factor. For example, if a minimum X of any factor is required, and a value of 2×is available, the safety factor is 2. Similarly, if a maximum Y of any factor is the most allowed, then having a value for that factor of ½ Y also provides a safety factor of 2. Two lines are plotted. The first, noted by small squares at the data points, indicates the latch force in grams versus the safety factor for keeping the actuator latched. Since this is a "minimum" type specification, as the latch force goes up, the safety factor also increases. The other curve, noted by plus signs at the data points, is for latch force versus the safety factor for being able to unlatch the actuator In this case—since the smaller the latch force, the easier it is to unlatch the actuator —the curve runs in the opposite direction, i.e., as the latch force increases, the safety factor for having enough actuator power to unlatch the actuator decreases.

The point where two lines cross is the optimum for the design since the safety factor for staying latched and being able to unlatch are the same—about 3.5—and both factors are 3.5 times the minimum or maximum required or allowed respectively.

Once this type of analysis has been accomplished, it is relatively simple matter to design a magnetic latch to fit the optimization graph.

First the designer must select a magnet of the type and size to place the desired latch force in the optimum portion of a gap versus latch force curve, such as the graph in FIG. 5.

With this type of information, the present invention lends itself to a particularly simple solution: form the magnetic latch with the optimum magnet and limit the thickness of the molded rubber between the magnet and the contact surface to the desired optimum gap.

While the examples cited have been discussed in relationship to a rotary VIM actuator, the design principals of the invention described with reference to FIG. 5 apply to linear actuators as well and are equally valid for all types of actuator motors. The designer must simply select an appropriate stationary point to which to mount the magnetic latch and crash stop and a complementary point on the moving portion of the actuator for the mounting of the low mass striker plate.

It is a matter of design choice whether the selected park position is at the inner or outer portion of the disc, or whether the park position places the heads on ramps or other similar head lifting device, or simply allows the heads to come to rest on the disc surface.

Modifications to the examples presented may occur to a person skilled in the art after studying this disclosure. Therefore, the scope of the invention is to be limited only by the following claims.

What is claimed is:

1. In a disc drive data storage device designed and specified to withstand a defined range of shock forces during non-operating conditions and comprising a base housing, a spindle motor mounted to said base housing and having a hub to which is mounted at least one disc, said disc having on at least one surface thereof a plurality of circular, concentric data tracks onto which data may written and from which data may be read, said disc drive data storage device further comprising an actuator mechanism comprising a motor under control of electronic circuitry and head mounting means to which is mounted at least one read/write head, said actuator means including a moving portion adapted to controllably move said read/write head into co-operative arrangement with said data tracks on said discs to perform said writing and reading, said moving portion of said actuator means also mounting a striker plate of magnetizable metal, said actuator means having a defined range of motion including a park position for said read/write heads at one end of said defined range of motion, an improved integrated latch mechanism and crash stop including a body formed of an elastic, resilient material and a permanent magnet of known strength in association with two flux concentrating pole pieces, said magnets and pole pieces being completely surrounded by said body, said integrated latch mechanism and crash stop including mounting means for attaching said body to a stationary point in said disc drive, said body further comprising a contact surface closely adjacent said magnet and said pole pieces and a defined thickness between said contact surface and said magnet and said pole pieces, said stationary point for mounting said integrated latch mechanism and crash being selected to bring said striker plate into co-operative arrangement with said contact surface when said moving portion of said actuator has reached said park position, said elastic, resilient body material being of sufficient thickness that the pole piece gap between the pole pieces and strike plate is within the resilient body, said material selected to absorb the impact between said striker plate and said contact surface when said actuator reaches said park position and limit said defined range of motion of said moving portion of said actuator in the direction of said integrated latch mechanism and crash stop, said defined thickness between said contact surface and said magnet and said pole pieces being selected to determine the magnetic latching force between said magnet and said pole pieces and said striker plate.

2. An integrated latch mechanism and crash stop as claimed in claim 1, wherein said magnet and said pole pieces are arranged with said pole pieces adjacent opposite poles of said magnet and form a magnetic gap facing said contact surface.

3. An integrated latch mechanism and crash stop as claimed in claim 1, wherein said elastic, resilient body material is a polyurethane.

4. An integrated latch mechanism and crash stop as claimed in claim 1, wherein said elastic, resilient body material is a butyl rubber.

5. An integrated latch mechanism and crash stop as claimed in claim 1, wherein said mounting means comprises a formed extension of said body adapted for co-operative engagement with a complementary shaped recess in said stationary mounting point.

6. An integrated latch mechanism and crash stop as claimed in claim 1, wherein said latching force, as determined by said defined thickness of said body material between said magnet and pole pieces and said contact surface, is optimized to ensure that said latching force is large enough to hold said actuator in said parked position for all shock loads within said specified range of shock forces under non-operating conditions, and that said latching force is small enough to ensure that said actuator motor will be capable of overcoming said latching force to unlatch said actuator.

7. An integrated latch mechanism and crash stop as claimed in claim 1, wherein said magnet and said defined thickness of said body material between said magnet and pole pieces and said contact surface are selected such that typical small manufacturing variations result in only minor variations in said latching force.

8. An integrated latch mechanism and crash stop as claimed in claim 1, wherein said magnet comprises a material in that group of materials called rare earths.

9. An integrated latch mechanism and crash stop as claimed in claim 8, wherein said rare earth is samarium cobalt.

10. An improved integrated magnetic latch mechanism and crash stop for use in a disc drive data storage device designed and specified to withstand a defined range of shock forces during non-operating conditions and comprising a base housing, a spindle motor mounted to said base housing and having a hub to which is mounted at least one disc, said disc having on at least one surface thereof a plurality of circular, concentric data tracks onto which data may be written and from which data may be read, said disc drive data storage device further comprising an actuator mechanism comprising a motor under control of electronic circuitry and head mounting means to which is mounted at least one read/write head, said actuator means including a moving portion adapted to mount said head mounting means and controllably move said read/write head into co-operative arrangement with said date tracks on said discs to perform said writing and reading, said moving portion of said actuator means also mounting a striker plate of magnetizable metal, said actuator means having a defined range of motion including a park position for said read/write heads at one end of said defined range of motion, said improved integrated latch mechanism and crash stop including a body formed of an elastic, resilient material and a permanent magnet of known flux strength in association with two flux concentrating pole pieces, said magnets and pole pieces being completely surrounded by said body, said integrated latch mechanism and crash stop including mounting means for attaching said body to a stationary point in said disc drive, said body further comprising a contact surface closely adjacent said magnet and said pole pieces and a defined thickness between said contact surface and said magnet and said pole pieces, said stationary point for mounting said integrated latch mechanism and crash stop being selected to bring said striker plate into co-operative arrangement with said contact surface when said moving portion of said actuator has reached said park position, said elastic, resilient body material being of sufficient thickness that the pole piece gap between the pole pieces and strike plate is within the resilient body, said material selected to absorb the impact between said striker plate and said contact surface when said actuator reaches said park position and limit said defined range of motion of said moving portion of said actuator in the direction of said integrated latch mechanism and crash stop, said defined thickness between said contact surface and said magnet and said pole pieces being selected to determined the magnetic latching force between said magnet and said pole pieces and said striker plate.

11. An integrated latch mechanism and crash stop as claimed in claim 10, wherein said magnet and said pole pieces are arranged with said pole pieces adjacent opposite poles of said magnet and form a magnetic gap facing said contact surface.

12. An integrated latch mechanism and crash stop as claimed in claim 10, wherein said elastic, resilient body material is a polyurethane.

13. An integrated latch mechanism and crash stop as claimed in claim 10, wherein said elastic, resilient body material is a butyl rubber.

14. An integrated latch mechanism and crash stop as claimed in claim 10, wherein said mounting means comprises a formed extension of said body adapted for co-operative engagement with a complementary shaped recess in said stationary mounting point.

15. An integrated latch mechanism and crash stop as claimed in claim 10, wherein said latching force, as determined by said defined thickness of said body material between said magnet and pole pieces and said contact surface, is optimized to ensure that said latching force is large enough to hold said actuator in said parked position for all shock loads within said specified range of shock forces under non-operating conditions, and that said latching force is small enough to ensure that said actuator motor will be capable of overcoming said latching force to unlatch said actuator.

16. An integrated latch mechanism and crash stop as claimed in claim 10, wherein said magnet and said defined thickness of said body material between said magnet and pole pieces and said contact surface are selected such that typical small manufacturing variations result in only minor variations in said latching force.

17. An integrated latch mechanism and crash stop as claimed in claim 10, wherein said magnet comprises a material in that group of materials called rare earths.

18. In a disc drive data storage device comprising a base housing, a spindle motor mounted in said base housing and having a hub on which is supported at least one disc, said disc having a plurality of circular concentric data tracks on which data may be written and read, said data storage device further comprising a rotary actuator mechanism including an arm extending over said disc and supporting a transducer at a distal end thereof, a pivot supporting said arm for rotation in response to actuation of a voice coil motor mounted at a second end of said arm opposite to said transducer so that selective activation of said motor positions said transducer over a selected track on said disc, said voice coil motor including a coil mounted on said second end of said arm, said disc drive including an improved latch and crash stop mechanism including a body mounted on said base housing to the rear of said motor coil including a magnet surrounded by a body of elastic resilient material of a defined thickness and a strike plate mounted at said second end of said arm and positioned to cooperate with said magnet and define a latch and crash stop position at one end of a path of movement of said arm and coil, said resilient material filling a gap between said magnet and said strike plate so that said gap is within said resilient body.

19. A disc drive as claimed in claim 18 wherein said coil lies flat in a plane defined by movement of said arm.

20. A disc drive as claimed in claim 18 wherein said coil has a leading edge toward a direction of movement of said coil and arm and a trailing edge away from a direction of movement of said coil, said strike plate for said crash stop being mounted near the trailing edge of said coil to minimize the space occupied by said magnetic latch.

21. A disc drive as claimed in claim 20 wherein said magnet includes a pair of flux concentrating pole pieces closely adjacent said magnet, said magnet and pole pieces being surrounded by said elastic material.

22. A disc drive as claimed in claim 20 wherein said body surrounding said magnet is shaped as an isosceles prism with the most acute angle truncated parallel to the long axis of the magnet, the truncated face forming a contact surface for said strike plate.

23. A disc drive as claimed in claim 22 including a hollow cylindrical housing mounted on said base casting and a cylindrical mounting member formed on said truncated prism opposite said defined contact surface, said mounting member being inserted into said housing to support said crash stop on said housing base.

24. A disc drive as claimed in claim 23 wherein said isosceles prism shaped body includes an opening extending therethrough to connect said prism directly to said housing base, said magnet and pole pieces being supported between said opening and said truncated contact surface.

* * * * *